US011100237B2

(12) United States Patent
     Gu

(10) Patent No.: US 11,100,237 B2
(45) Date of Patent: Aug. 24, 2021

(54) IDENTIFY AND PROTECT SENSITIVE TEXT IN GRAPHICS DATA

(71) Applicant: Citrix Systems, Inc., Fort Lauderdale, FL (US)

(72) Inventor: Youjun Gu, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 245 days.

(21) Appl. No.: 15/698,822

(22) Filed: Sep. 8, 2017

(65) Prior Publication Data
    US 2019/0080100 A1    Mar. 14, 2019

(51) Int. Cl.
     *H04L 29/06*     (2006.01)
     *G06F 21/60*     (2013.01)
     *G06T 11/60*     (2006.01)
     *G06F 21/62*     (2013.01)
     *G06F 21/84*     (2013.01)
     *G06K 9/00*      (2006.01)
     *G06F 40/106*    (2020.01)
     *G06F 40/151*    (2020.01)
     *G06F 40/166*    (2020.01)
     *G06F 40/174*    (2020.01)
     *G06F 40/284*    (2020.01)
     *G06F 40/289*    (2020.01)

(52) U.S. Cl.
     CPC ........ *G06F 21/604* (2013.01); *G06F 21/6245* (2013.01); *G06F 21/84* (2013.01); *G06F 40/106* (2020.01); *G06F 40/151* (2020.01); *G06F 40/166* (2020.01); *G06F 40/174* (2020.01); *G06F 40/284* (2020.01); *G06F 40/289* (2020.01); *G06K 9/00463* (2013.01); *G06T 11/60* (2013.01)

(58) Field of Classification Search
     CPC ........ G06F 21/604; G06F 17/27; G06F 17/24; G06T 11/60
     See application file for complete search history.

(56) References Cited

U.S. PATENT DOCUMENTS

| 10,025,952 | B1 * | 7/2018 | Wang ................... G06F 21/6245 |
| 2010/0011000 | A1 * | 1/2010 | Chakra .................. G16H 10/60 |
| | | | 707/E17.005 |
| 2011/0128360 | A1 * | 6/2011 | Hatzav ............... G06K 9/00469 |
| | | | 348/61 |
| 2012/0179910 | A1 * | 7/2012 | Orsini ..................... G06F 21/31 |
| | | | 713/167 |
| 2014/0208418 | A1 * | 7/2014 | Libin ................... G06F 21/6209 |
| | | | 726/19 |
| 2018/0218170 | A1 * | 8/2018 | Abi Antoun ........ G06F 21/6245 |

\* cited by examiner

*Primary Examiner* — Wasika Nipa
(74) *Attorney, Agent, or Firm* — Allen, Dyer, Doppelt + Gilchrist, PA

(57) ABSTRACT

A computing device includes a processor to generate graphics data that includes text, a display to display the graphics data, and a memory to record the displayed graphics data. A sensitive text handling engine is coupled to the processor, the display and the memory. The sensitive text handling engine is configured to perform certain steps before sensitive text within the graphics data is displayed and recorded. These steps include receive sensitive text identification settings, detect text in the graphics data and store the detected text as text images, translate the text images into text strings, and identify sensitive text within the text strings based on the sensitive text identification settings.

21 Claims, 3 Drawing Sheets

IDENTIFY AND PROTECT SENSITIVE TEXT IN GRAPHICS DATA

TECHNICAL FIELD

The present disclosure relates to the field of computing devices, and more particularly, to identifying and protecting sensitive text in graphics data.

BACKGROUND

Sensitive data is widely used throughout the workplace. Sensitive data, for example, may include credit card numbers, salary information, personal health data, tax IDs, personal information, authentication credentials, etc. Misuse of sensitive data may cause privacy or security problems. Extra protection is needed to prevent the disclosure of sensitive data. In fact, the Open Web Application Security Project (OWASP) has listed "sensitive data disclosure" as one of the top 10 web risks.

Graphics containing sensitive data may need to be transferred or stored. One typical example is session recording in a virtual application/virtual desktop (VA/VD). VA/VD session recording usually encodes graphics data of user sessions into video files, and stores them for a period of time. Per work roles of VA/VD session users, different kinds of sensitive data is exposed. So during a VA/VD session recording, sensitive data may be displayed and recorded. Such sensitive data usually exists in text format (i.e., sensitive text).

Stored or transferred graphics with sensitive data brings security risks. On one hand, they may be misused, as the users of the stored/transferred graphics may not have authorization to access the sensitive data. On the other hand, graphics data with sensitive information are more attractive for malicious attackers. Consequently, there is a need to mitigate the disclosure of sensitive data in graphics data.

SUMMARY

A computing device includes a processor configured to generate graphics data that includes text, a display configured to display the graphics data, a memory configured to record the displayed graphics data, and a sensitive text handling engine coupled to the processor, the display and the memory. The sensitive text handling engine may be configured to perform certain steps before sensitive text within the graphics data is displayed and recorded. These steps may include receive sensitive text identification settings, detect text in the graphics data and store the detected text as text images, translate the text images into text strings, and identify sensitive text within the text strings based on the sensitive text identification settings.

The sensitive text handling engine may be further configured to store position information of the text images in the graphics data, with the position information to be used by the sensitive text handling engine to identify the sensitive text.

The sensitive text handling engine may be further configured to receive sensitive text protection settings, and to protect the sensitive text based on the sensitive text protection settings.

The sensitive text protection settings may comprise a warning message setting, and wherein the sensitive text handling engine may be further configured to generate a warning message on the display based on the warning message setting when the sensitive text is identified.

The sensitive text protection settings may comprise a stop recording setting, and wherein the sensitive text handling engine may be further configured to stop recording of the graphics data based on the stop recording setting when the sensitive text is identified.

The sensitive text protection settings may comprise a hide sensitive text setting, and wherein the sensitive text handling engine may be further configured to protect the sensitive text by hiding the sensitive text based on the hide sensitive text setting. The sensitive text may be hidden by shading the sensitive text, or by replacing the sensitive text with different text.

The sensitive text identification settings may comprise a user-configured sensitive text pattern setting for generating at least one sensitive text pattern, and wherein the sensitive text handling engine may be further configured to identify the sensitive text based on the at least one sensitive text pattern.

The sensitive text identification settings may further comprise a position setting for generating at least one position input and a character length setting for generating at least one character length input, and wherein the sensitive text handling engine may be further configured to identify the sensitive text based on the following steps: match the at least one sensitive text pattern with at least one of the text images within the text strings, and use the position input and the character length input to identify the sensitive text relative to the matched sensitive text pattern.

Another aspect is directed to a method for operating the computing device as described above. The method comprises operating the sensitive text handling engine to perform certain steps before sensitive text within the graphics data is displayed and recorded. These steps may include receive sensitive text identification settings, detect text in the graphics data and store the detected text as text images, translate the text images into text strings, and identify sensitive text within the text strings based on the sensitive text identification settings.

Yet another aspect is directed to a non-transitory computer readable medium for a computing device as described above, with the non-transitory computer readable medium having a plurality of computer executable instructions for causing the computing device to perform the step of operating the sensitive text handling engine to perform the certain steps before sensitive text within the graphics data is displayed and recorded. These steps may include receive sensitive text identification settings, detect text in the graphics data and store the detected text as text images, translate the text images into text strings, and identify sensitive text within the text strings based on the sensitive text identification settings.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
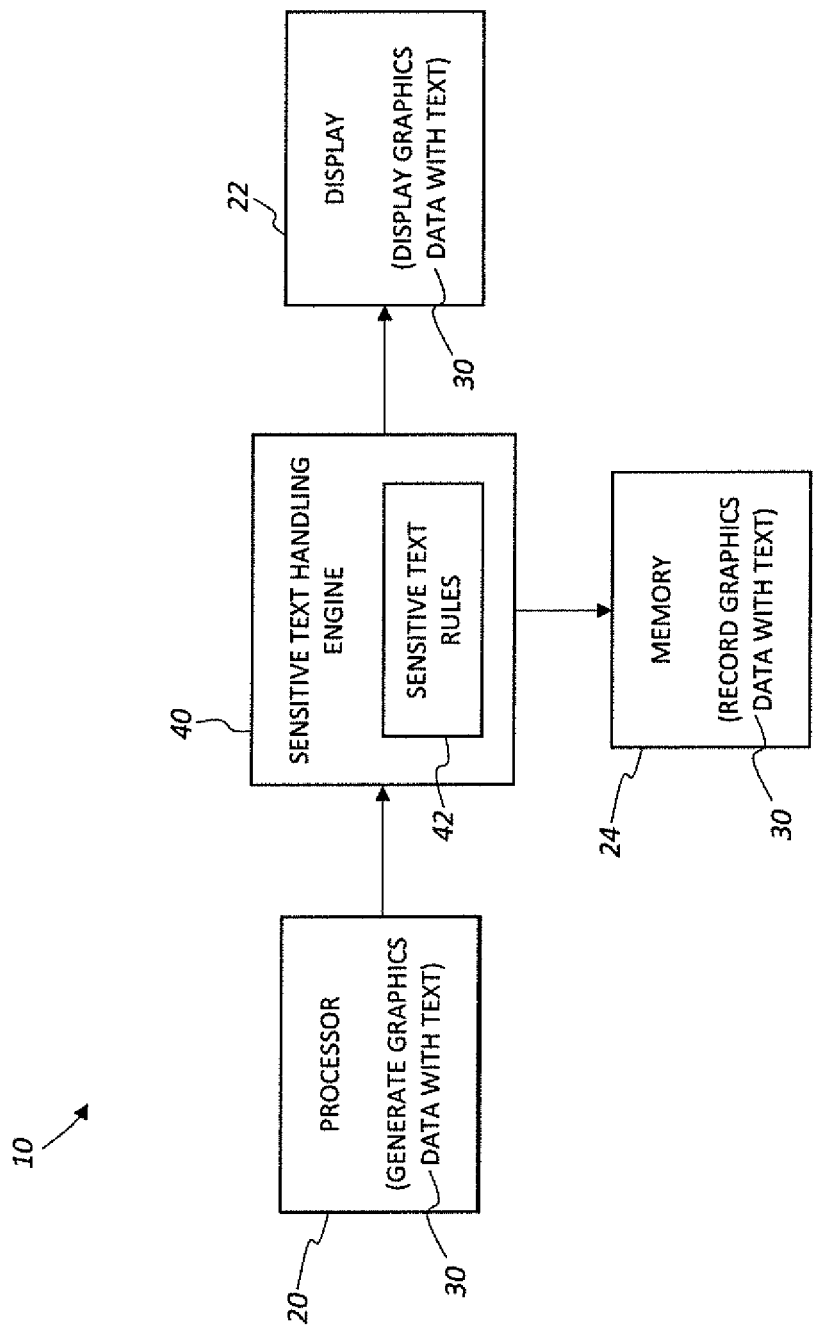
FIG. 1 is a block diagram of a computing device with a sensitive text handling engine in accordance with the present disclosure.

Referring now to FIG. 1, the illustrated computing device 10 includes a processor 20 configured to generate graphics data that includes text 30, a display 22 configured to display the graphics data 30, and a memory 24 configured to record the displayed graphics data 30. A sensitive text handling engine 40 is coupled to the processor 20, the display 22 and the memory 24.

The sensitive text handling engine 40 may be configured as software, hardware, or a combination of both. In one embodiment, the sensitive text handling engine 40 is a processor separate from processor 20 and is configured to execute the sensitive text rules 42. In another embodiment, the sensitive text rules 42 are stored in a memory for execution by the processor 20. This memory may be memory 24 or a separate memory.

The sensitive text handling engine 40 is configured to identify and protect sensitive text within the graphics data 30 before being displayed and recorded. The sensitive text handling engine 40 operates based on sensitive text rules 42. The illustrated computing device 10 may be a physical or virtual machine. As a virtual machine, for example, a session recording in a virtual desktop encodes the graphics data 30 into video files and stores them for a period of time.

If sensitive text were included within the stored video files, then the sensitive text may be misused by an unauthorized user having access to the stored video files. Alternatively, the sensitive text included within the stored video files are susceptible to malicious attackers. Either way, the sensitive text handling engine 40 advantageously reduces the risk of disclosing sensitive text within recorded graphics data 30.

The sensitive text handling engine 40 requires the sensitive text rules 42 to be defined prior to identifying and protecting sensitive text within the graphics data 30. The sensitive text rules 42 may be defined by a user or an administrator of the computing device 10.

The sensitive text handling engine 40 is configured to detect text in the graphics data 30, and store the detected text as text images along with its position within the graphics data 30. The text images are then translated into text strings. The sensitive text handling engine 40 then identifies sensitive text within the text strings based on the sensitive text rules 42 defined for the sensitive text handling engine 40.

Figure 2:
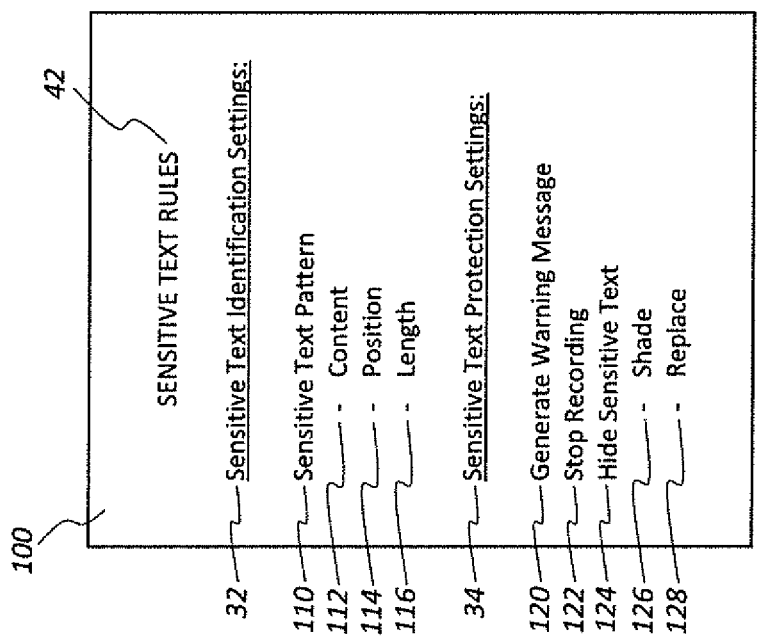
FIG. 2 is a display screen showing the sensitive text rules for the sensitive text handling engine illustrated in FIG. 1.

Referring now to the display screen 100 in FIG. 2, the sensitive text rules 42 include sensitive text identification settings 32 and sensitive text protection settings 34. As the name of the settings imply, the sensitive text identification settings 32 are used by the sensitive text handling engine 40 to identify the sensitive text within the graphics data 30, and the sensitive text protection settings 34 are used by the sensitive text handling engine 40 to protect the sensitive text within the graphics data 30.

The sensitive text identification settings 32 allow for a sensitive text pattern 110 to be entered. The sensitive text pattern 110 will be compared to the text strings in the graphics data 30. The sensitive text pattern 110 is defined by its content 112, position 114 and length 116.

The content 112 corresponds to the text that is to be compared or matched to the text strings within the graphics data 30. For example, the content may be "annual salary" or "social security number" or "credit card number." The content is not limited to these examples, and may be any input used to identify sensitive text.

As another example, the content 112 may be a specific name in a specific page/screen, such as text of anyone with the last name "Smith" in a page/screen with a title "personal medical record." As yet another example, the content 112 may be a particular credit card number such as "1234 5678 9012 3456."

The position 114 and length 116 that is entered corresponds to where the sensitive text is located with respect to the content 112 when matched in the text strings of the graphics data 30. The position 114 designates an area with respect to the matched content 112 on where the sensitive text is located. For example, the area may be to the "left", "right", "above" or "below" the matched content 112. If the matched content 112 is "credit card number" then the position 114 may be the area to the "right" of the matched "credit card number" content.

In this example, the position 114 of the area having sensitive text has been selected as being to the "right" of the matched "credit card number" content. The length 116 is used to define how many text characters will occupy this area to the "right" of the matched "credit card number" content. If the area corresponds to a credit card number, for example, then the length 116 is set to 20. The length 116 is selected to be large enough to include all of the sensitive text within the graphics data 30.

Still referring to FIG. 2, there are a number of options under the sensitive text protection settings 34. Once sensitive text has been identified by the sensitive text handling engine 40, one option to protect the sensitive text is by generating a warning message 120 on the display 22. The warning message 120 alerts the user that sensitive text is about to be displayed and recorded.

Another option to protect sensitive text is to select the stop recording 122 option. Recording of the graphics data 30 may be stopped until there is no longer any sensitive text in the graphics data 30. Yet another option is to hide sensitive text 124. Options for hiding the sensitive text within the graphics data 30 includes shading 126 or replacing 128. Shading 126 completely conceals the sensitive text, whereas the replacing 128 option replaces the sensitive text with non-sensitive text. For example, the sensitive text may be replaced with "x"s or "-"s or any combination of alphanumeric characters.

A flow diagram 200 illustrating the steps for identifying and protecting sensitive text within graphics data 30 before being displayed and recorded by the illustrated computing device 10 will now be discussed.

At step 1, the sensitive text rules 42 for the sensitive text handling engine 40 are defined by the user or administrator of the computing device 10. In the illustrated display screen 202, the content 112 of the sensitive text pattern 110 is "credit card number." The position 114 is "right side" and the length 116 is 20. The content 110, position 112 and length 114 inputs are part of the sensitive text identification settings 32 used by the sensitive text handling engine 40 to identify sensitive text within the graphics data 30.

The sensitive text rules also include the sensitive text protection settings 34 used by the sensitive text handling engine 40 to protect the sensitive text within the graphics data 30. In the illustrated display screen 202, the hide sensitive text 124 option is selected, and the hiding is to be done by shading as indicated by selection of the shading 126 option.

At step 2, graphics data 30 generated by the processor 30 is passed to the sensitive text handling engine 40 before being recorded and displayed. The illustrated graphics data 30 includes sensitive credit card information.

The sensitive text handling engine 40 is configured to perform steps 3, 4, 5, and 6. At step 3, text in the graphics data 30 is detected, and the detected text is stored as text images with position information. In this example, the sensitive data may be stored as a text image "Credit Card Number:" with position (top-left coordinate 1, bottom-right coordinate 1), and text image "1234 5678 9012 3456" with position (top-left coordinate 2, bottom-right coordinate 2). The position information is based on coordinates describing relative positions between the different text images.

At step 4, the text images are translated into text strings. In this example, following text strings will be text string "Credit Card Number:" with position (top-left coordinate 1, bottom-right coordinate 1), and text string "1234 5678 9012 3456" with position (top-left coordinate 2, bottom-right coordinate 2).

At step 5, the sensitive text within the text strings is identified based on the sensitive text identification settings 32. In this example, the sensitive text is on the right side of the matched "credit card number" and has a length of 20 characters. The sensitive text is the number of the credit card, in this case "1234 5678 9012 3456." At step 6, the sensitive text is protected based on the sensitive text protection settings 34. In this example, the sensitive text hidden by shading "1234 5678 9012 3456."

At step 7, the graphics data with the sensitive text protected is output for further handling. Display 204 displays the graphics data 30 with the sensitive text protected by shading 206. The graphics data 30 with the shaded sensitive text 206 may now be displayed by display 22 and recorded in memory 24.

Figure 3:
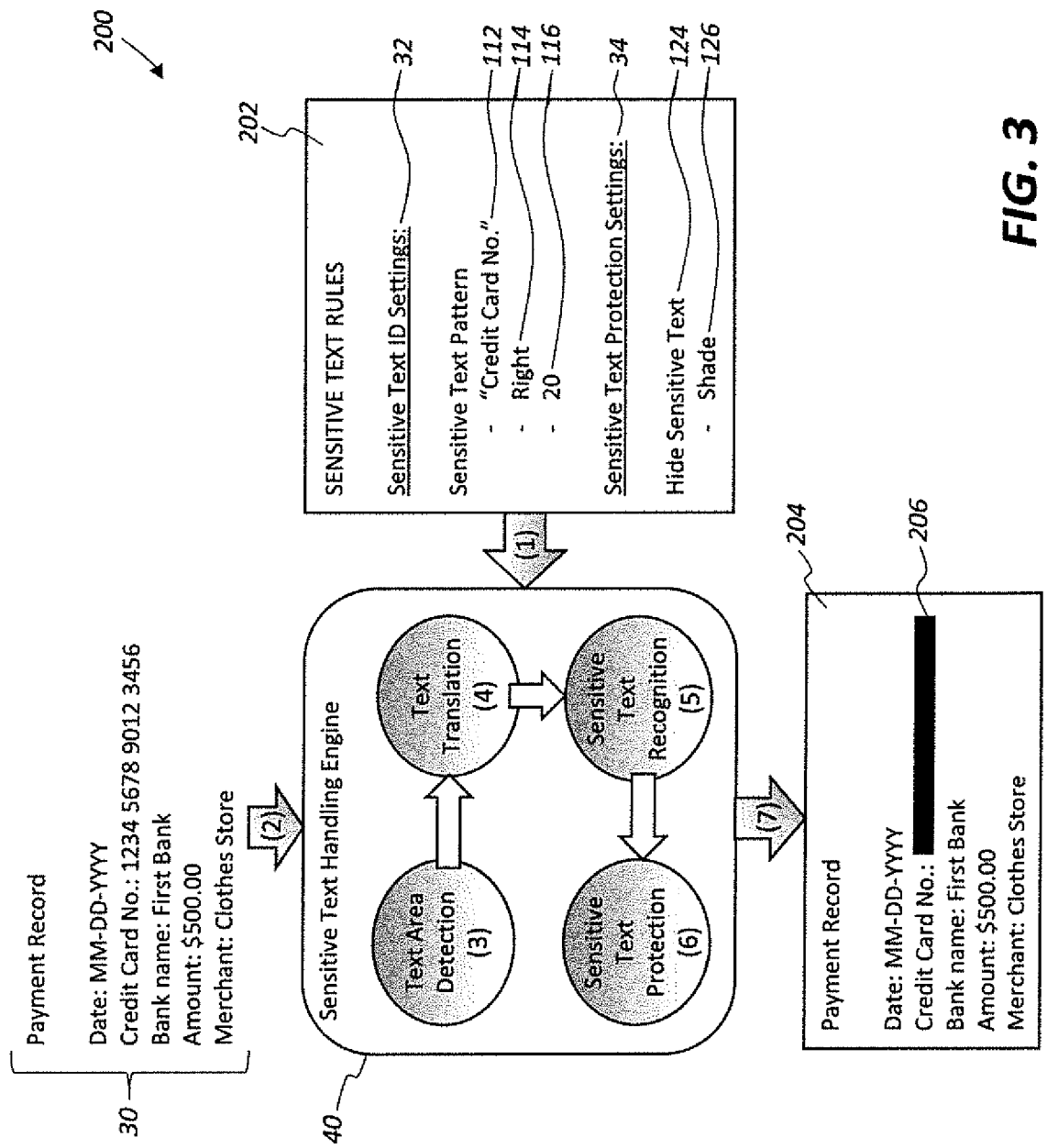
FIG. 3 is a flow diagram illustrating the steps for identifying and protecting sensitive text within graphics data before being displayed and recorded by the computing device illustrated in FIG. 1.

Referring now to the flowchart 200 in FIG. 3, another aspect of the disclosure is directed to a method for operating a computing device 20 as described above. The method comprises operating the sensitive text handling engine 40 to perform certain steps before sensitive text within the graphics data 30 is displayed and recorded. These steps may include receive sensitive text identification settings 32, detect text in the graphics data 30 and store the detected text as text images, translate the text images into text strings, and identify sensitive text within the text strings based on the sensitive text identification settings 32.

Yet another aspect is directed to a non-transitory computer readable memory for a computing device 20 as described above, with the non-transitory computer readable medium having a plurality of computer executable instructions for causing the computing device 20 to perform the step of operating the sensitive text handling engine 40 to perform certain steps before sensitive text within the graphics data 30 is displayed and recorded. These steps may include receive sensitive text identification settings 32, detect text in the graphics data 30 and store the detected text as text images, translate the text images into text strings, and identify sensitive text within the text strings based on the sensitive text identification settings 32.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the foregoing description.

That which is claimed:

1. A computing device comprising:
at least one processor configured to generate graphics data that includes text;
a display configured to display the graphics data;
a memory configured to record the displayed graphics data; and
said at least one processor is further configured to perform textual recognition on the graphics data for sensitive information before sensitive text within the graphics data is displayed and recorded, with the sensitive information being identified without prior analysis of the graphics data based on the following steps:
receive sensitive text identification settings corresponding to at least one sensitive text pattern defined by content, position and length, with the content describing text that is to be matched within the graphics data so as to determine the presence of sensitive text within the graphics data, with the position designating an area with respect to a matched content on where the sensitive text is located, and with the length defining how many characters will occupy the area of the matched content,
detect text in the graphics data, with the detected text corresponding to at least one text image, and the at least one text image including position information within the graphics data that includes coordinates describing a relative position within the graphics data,
translate the at least one text image into at least one text string that includes the position information, and
identify sensitive text within the at least one text string based on the following
determine the presence of sensitive text within the graphics data by comparing the defined content of the sensitive text pattern to the at least one text string for a match, and
in response to a match, use the defined position and the defined length of the sensitive text pattern to identify the sensitive text relative to a position of the matched content.

2. The computing device according to claim 1 wherein said at least one processor is further configured to store the position information of the at least one text image in the graphics data, with the position information to be used by said sensitive text handling engine to identify the sensitive text.

3. The computing device according to claim 1 wherein the sensitive text protection settings comprise a warning message setting, and wherein said at least one processor is further configured to generate a warning message on said display based on the warning message setting when the sensitive text is identified.

4. The computing device according to claim 1 wherein the sensitive text protection settings comprise a stop recording setting, and wherein said at least one processor is further configured to stop recording of the graphics data based on the stop recording setting when the sensitive text is identified.

5. The computing device according to claim 1 wherein the sensitive text protection settings comprise a hide sensitive text setting, and wherein said at least one processor is further configured to protect the sensitive text by hiding the sensitive text based on the hide sensitive text setting.

6. The computing device according to claim 5 wherein the sensitive text is hidden by shading the sensitive text.

7. The computing device according to claim 5 wherein the sensitive text is hidden by replacing the sensitive text with different text.

8. The computing device according to claim 1 wherein the sensitive text identification settings comprise a user-configured sensitive text pattern setting for generating at the least one sensitive text pattern.

9. A method for operating a computing device comprising at least one processor to generate graphics data that includes text, a display to display the graphics data, and a memory configured to record the displayed graphics data, the method comprising:
  operating the at least one processor to perform textual recognition on the graphics data for sensitive information upon receipt of the graphics data before sensitive text within the graphics data is displayed and recorded:
    receive sensitive text identification settings corresponding to at least one sensitive text pattern defined by content, position and length, with the content describing text that is to be matched within the graphics data so as to determine the presence of sensitive text within the graphics data, with the position designating an area with respect to a matched content on where the sensitive text is located, and with the length defining how many characters will occupy the area of the matched content,
    detect text in the graphics data, the detection including to generate a plurality of images of the text detected in the graphics data, and at least one image of the text including coordinates describing a relative position within the graphics data,
    translate the plurality of images into different text strings that includes the position information, and
    identify sensitive text within the at least one text string based on the following
      determine the presence of sensitive text within the graphics data by comparing the defined content of the sensitive text pattern to the at least one text string for a match, and
      in response to a match, use the defined position and the defined length of the sensitive text pattern to identify the sensitive text relative to a position of the matched content.

10. The method according to claim 9 wherein the at least one processor is further operated to store the position information of the at least one text image in the graphics data, with the position information to be used to identify the sensitive text.

11. The method according to claim 9 wherein the sensitive text protection settings comprise a warning message setting, and wherein the at least one processor is further operated to generate a warning message on the display based on the warning message setting when the sensitive text is identified.

12. The method according to claim 9 wherein the sensitive text protection settings comprise a stop recording setting, and wherein the at least one processor is further operated to stop recording of the graphics data based on the stop recording setting when the sensitive text is identified.

13. The method according to claim 9 wherein the sensitive text protection settings comprise a hide sensitive text setting, and wherein the at least one processor is further operated to protect the sensitive text by hiding the sensitive text based on the hide sensitive text setting.

14. The method according to claim 9 wherein the sensitive text identification settings comprise a user-configured sensitive text pattern setting for generating the at least one sensitive text pattern.

15. A non-transitory computer readable medium for a computing device comprising at least one processor to generate graphics data that includes text, a display to display the graphics data, and a memory to record the displayed graphics data, with the non-transitory computer readable medium having a plurality of computer executable instructions for causing the computing device to perform steps comprising:
  operating the at least one processor to perform textual recognition on the graphics data for sensitive information upon receipt of the graphics data before sensitive text within the graphics data is displayed and recorded:
    receive sensitive text identification settings corresponding to at least one sensitive text pattern defined by content, position and length, with the content not being a scanned image and describing text that is to be matched within the graphics data so as to determine the presence of sensitive text within the graphics data, with the position designating an area with respect to a matched content on where the sensitive text is located, and with the length defining how many characters will occupy the area of the matched content,
    detect text in the graphics data, the detection including to generate a plurality of images of the text detected in the graphics data, and at least one image of the text including coordinates describing a relative position within the graphics data,
    translate the plurality of images into different text strings that includes the position information, and
    identify sensitive text within the at least one text string based on the following
      determine the presence of sensitive text within the graphics data by comparing the defined content of the sensitive text pattern to the at least one text string for a match, and
      in response to a match, use using the defined position and the defined length of the sensitive text pattern to identify the sensitive text relative to a position of the matched content.

16. The non-transitory computer readable medium according to claim 15 wherein the at least one processor is further operated to store the position information of the at least one text image in the graphics data, with the position information to be used to identify the sensitive text.

17. The non-transitory computer readable medium according to claim 15 wherein the sensitive text identification settings comprise a user-configured sensitive text pattern setting for generating the at least one sensitive text pattern.

18. The computing device according to claim 1 wherein said at least one processor is configured to access a video file providing the graphics data that includes text.

19. The method according to claim 9 wherein the at least one processor is configured to access a video file providing the graphics data that includes text.

20. A method comprising:
  performing, by a computing device, textual recognition on graphics data upon receipt of the graphics data prior to being displayed;
  detecting, by the computing device, sensitive text in the graphics data based on a comparison of text of the graphics data with a text string, the text string being indicative of the sensitive text;

identifying, by the computing device, a location of the sensitive text in the graphics data based on a match between the text of the graphics data and the text string, the location of the sensitive text being relative to position of the text;

modifying, by the computing device, the text of the graphics data to hide the sensitive text based on the identified location and a length of the sensitive text; and providing, by the computing device, the modified graphics data for display so as to protect the sensitive text.

21. The computing device according to claim 1 wherein said at least one processor receives the sensitive text identification settings prior to performing textual recognition on the graphics data for sensitive text, and with the sensitive text being identified based on the received sensitive text identification settings and without receiving additional input.

* * * * *